July 3, 1951 F. C. LUCAS ET AL 2,559,446
KNEE JOINT FOR ARTIFICIAL LIMBS
Filed Sept. 7, 1950 2 Sheets-Sheet 1
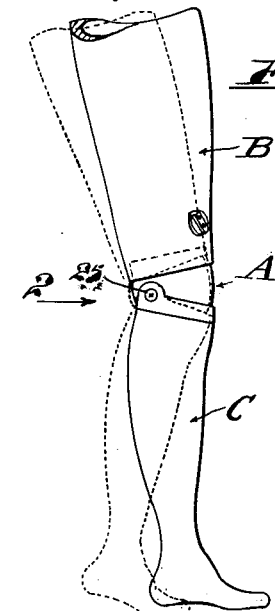
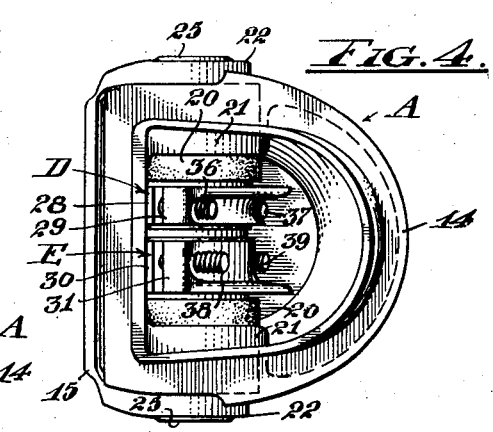
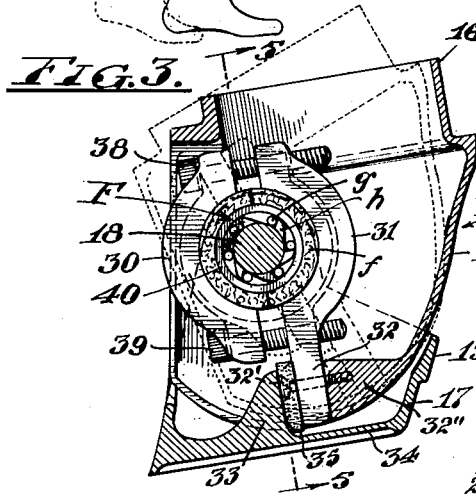
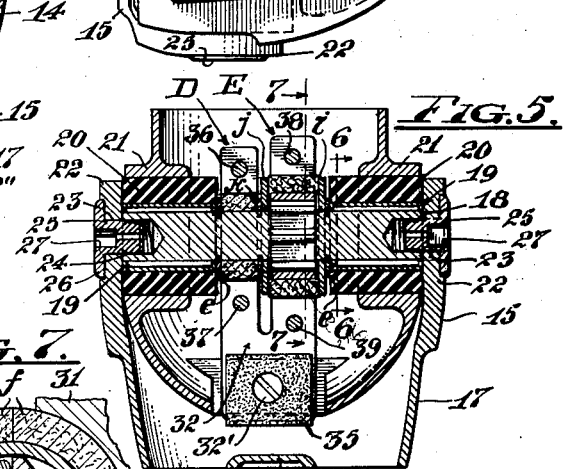
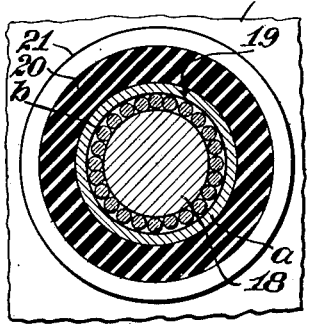
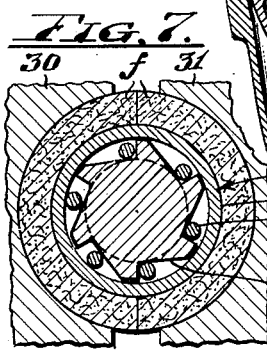
INVENTORS:
Fred C. Lucas
and Roy P. Lucas
By R. S. Berry
ATTORNEY July 3, 1951  F. C. LUCAS ET AL  2,559,446
KNEE JOINT FOR ARTIFICIAL LIMBS
Filed Sept. 7, 1950  2 Sheets-Sheet 2
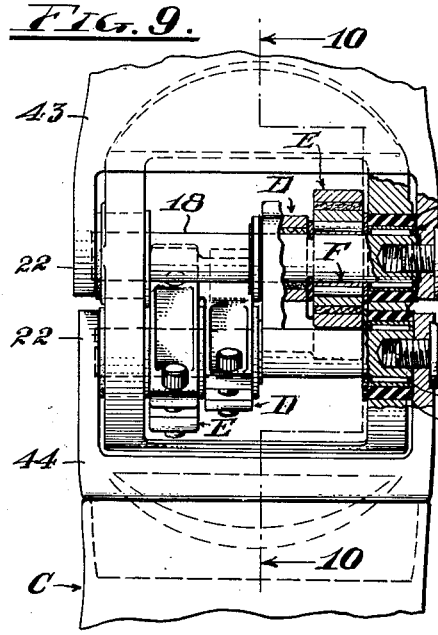
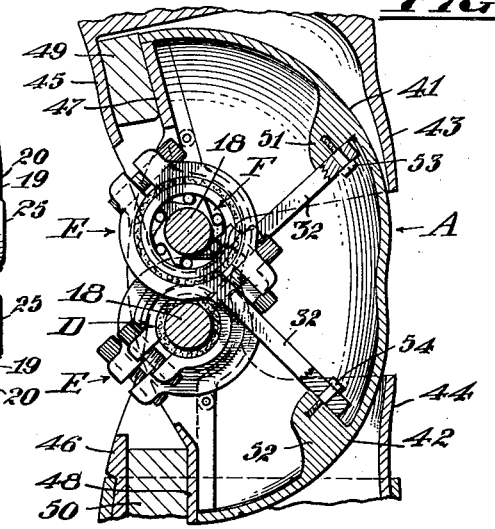
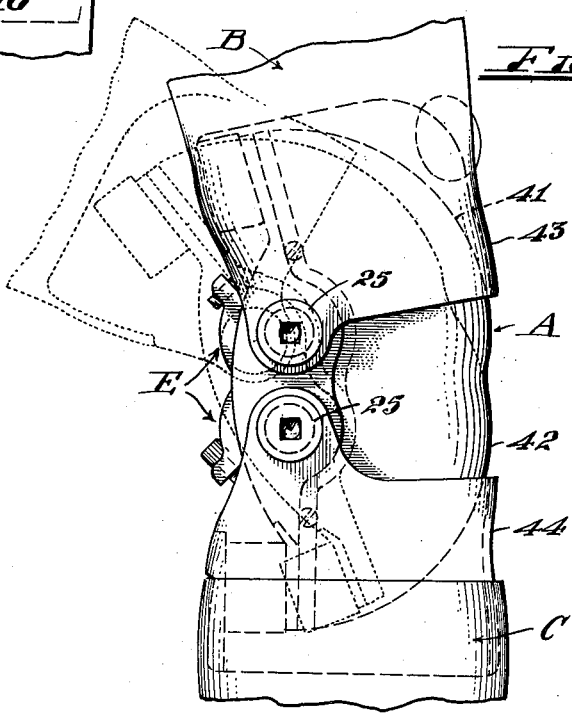
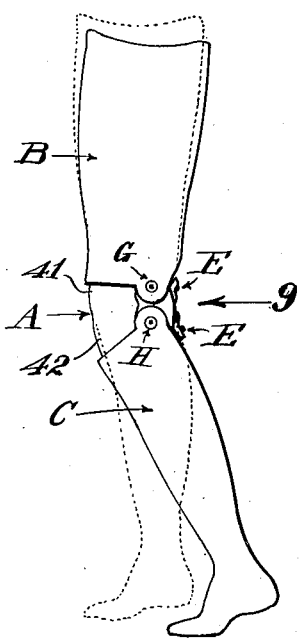
Inventors:
Fred C. Lucas
and Roy P. Lucas;
By R. S. Brunt
Attorney Patented July 3, 1951

2,559,446

UNITED STATES PATENT OFFICE 2,559,446

KNEE JOINT FOR ARTIFICIAL LIMBS

Fred C. Lucas and Roy P. Lucas,
Los Angeles, Calif.

Application September 7, 1950, Serial No. 183,642

8 Claims. (Cl. 3—2)

This invention relates to the knee joint of artificial limbs and has as its primary object the provision of an articulate joint between the shank and thigh portions of an artificial leg which is so constructed as to provide security against buckling, which will offer resistance to rearward relative movement of the shank and thigh portions and permit greater freedom of forward movement thereof, and which may be readily regulated to conform to the natural step of the individual wearer.

Another object is to provide a knee joint for artificial legs which will afford differential friction controlled opposed swinging movements of the shank and thigh portions of the leg relative to each other, whereby flexing of the joint in swinging the shank portion rearwardly relative to the thigh portion, as in bending the knee, will be under greater frictional resistance than when the joint is flexed in swinging the shank portion forwardly relative to the thigh portion.

Another object is to provide a simple and readily operable means for independently varying the frictional resistance to articulation of the joint in either direction so as to enable adjustment of the joint to meet the requirements of various persons and also to meet varying needs of the wearer.

Another object is to provide a knee joint of the above character embodying a pivotal or hinged connection between the relatively swinging parts thereof which is resiliently supported to cushion impacts imposed thereon as when the artificial leg is employed in walking or running.

Another object is to provide an effective means for limiting articulation of the joint in one direction with a cushioning action.

Another object is to provide a joint which is noiseless and which requires no lubrication.

Another object is to provide a knee joint having relatively moveable parts including a pivot shaft hingedly connecting the parts and equipped with an over-running clutch cooperable with a friction element to permit comparatively easy relative swinging movement of the parts in one direction and afford a restrained relative swinging movement in the opposite direction, with means for varying such restrained movements and which also embodies a separate adjustable brake directly engageable with the shaft for applying varying resistance to relative movement of the parts independent of said friction element and the over-running clutch.

Another object is to provide a joint of the above character which is applicable to either the single or double type of knee joints; the former embodying a single hinged connection between the shank and thigh portions of an artificial leg while the latter embodies two pivots on a knee element one of which connects with the shank portion and the other of which connects with the thigh portion.

A further object is to provide a knee joint having the features of invention above stated in which the parts are so formed and arranged as to facilitate their assemblage and adjustment and which are durable for a long period of operation, yet which may be readily removed and replaced and parts easily renewed when excessively worn without the necessity of employing skilled artisans as is the case with some types of artificial limbs now on the market, the construction of the present knee joint being such that the user may ordinarily take it apart and reassemble it, make repairs if necessary and also make the desired adjustments to suit his needs.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a view of an artificial limb as seen in side elevation as equipped with a single pivot articulate joint constructed in accordance with the invention.

Fig. 2 is a rear elevational view of the joint with parts shown in section as seen in the direction of the arrow 2 in Fig. 1.

Fig. 3 is a sectional view taken on the line 3—3 of Fig. 2 as seen in the direction indicated by the arrows, showing parts in elevation, and indicating in dotted lines an articulated position of the joint.

Fig. 4 is a plan view of the joint in the position shown in full lines in Fig. 3.

Fig. 5 is a view in section and elevation taken on the line 5—5 of Fig. 3 as seen in the direction indicated by the arrows.

Fig. 6 is an enlarged detail in cross section and elevation on the line 6—6 of Fig. 5 showing the mounting of the pivot shaft.

Fig. 7 is an enlarged cross sectional view as seen on the line 7—7 of Fig. 5 showing the over-running clutch and its associated brake element.

Fig. 8 is a view in side elevation of an artificial leg equipped with a double pivoted knee joint embodying the invention.

Fig. 9 is a rear elevational view as seen in the direction of the arrow 9 in Fig. 8, with parts shown in section.

Fig. 10 is a view in section and elevation taken on the line 10—10 of Fig. 9 as seen in the direction indicated by the arrows.

Fig. 11 is an enlarged view in side elevation of the knee joint shown in Fig. 8 as seen from the opposite side thereof, and indicating in dotted lines an articulated position of the joint.

Referring to the drawings more specifically A indicates generally the articulate knee joint embodying the invention and B and C designates respectively the thigh and shank portions of an artificial leg to which the knee joint A is applied. In the construction shown in Figs. 1 to 7 inclusive, the joint A embodies a hollow semi-spherical knee cap member 14 and a shell like semi-cylindrical socket member 15 which members are hingedly connected together for relative articulate movement with the lower part of the semi-spherical knee member 14 telescoped in the upper portion of the socket member 15 in slightly spaced relation thereto. The upper portion of the knee member 14 is formed with a flange 16 which extends into the lower end of the thigh portion B and is firmly and rigidly secured thereto in any suitable fashion. The lower portion of the socket member 15 is formed with a continuous marginal flange 17 which extends into the upper end of the shank portion C and is firmly and rigidly secured thereto in any suitable fashion. The knee cap member 14 and the socket member 15 are formed of cast metal of a character which is light in weight and of requisite strength whereby the structure is rendered highly durable.

The connection between the knee and socket members 14 and 15 embodies a cylindrical hardened metal shaft 18 fixed at its ends to the socket member 15 and revolubly and resiliently connected to the knee member 14 and mounted to extend transversely of the latter rearward of the center thereof but axially of the semi-cylindrical portions of the knee and socket members the shaft 18 being revolubly supported at each end thereof on roller bearings 19—19 encompassed by resilient sleeves 20—20 firmly affixed to and conforming to diametrically opposed open ended cylinders 21—21 integrally formed on the side walls of the knee member 14.

The roller bearings 19 each embody a metallic cylindrical sleeve $a$ on the inner periphery of which is arranged a series of spaced longitudinally extending needle bearings $b$ as particularly shown in Fig. 6. The outer ends of the shaft 18, bearings 19, and resilient sleeve 20 terminate substantially co-planar with the outer faces of the side portions of the knee member 14 so that a pair of parallel opposed lugs 22—22 formed on the upper rearward marginal portion of the socket member 15 may be positioned astride the knee member 14 in sliding contact with the opposite sides thereof in assembling the knee joint, so as to position the lugs 22 to overlie and bear against the outer ends of the shaft 18.

Formed in the lugs 22 are circular openings 23 arranged to register with internally threaded recesses 24 formed in and extending axially of the ends of the shaft 18, and projecting through the opening 23 are screws 25 which are tightly yet removably engaged with the threaded recesses 24; the screws having circular heads 26 which are counter-sunk in the outer faces of the lugs 22 and which heads are formed on their outer faces with flat sided recesses 27 for the reception of flat faced tools whereby the screws may be rotated in or out of engagement with the threaded recesses 24. The screws 25 serve to clamp the ends of the shaft 18 in tight not rotatable engagement with the socket member 15.

The mounting of the knee member 14 on the shaft 18 and the connection of the ends of the shaft with the socket member 15 constitutes the pivotal connection between the knee and socket members, and affords a ready means of assemblage of the articulate members of the knee joint. This construction also permits of the knee and socket member being readily separated, since by merely removing the screws 25 the yoke formed by the lugs 22 may be readily withdrawn out of engagement with the knee member 14 and whereby the shank portion C of the artificial leg may be readily removed from the knee joint to give access to the internal part of the joint for repairs if need be.

The shaft 18 is formed with spaced circumferential channels at the inner ends of the bearing sleeves $a$ in which are mounted split rings $e$ which serve in abutting the inner ends of the sleeves $a$ to hold the shaft 18 against longitudinal movement relative to the roller bearings 19.

Encompassing the shaft 18 between the split rings $e$—$e$ is a pair of friction brakes D and E, which embody relatively adjustable and separable arcuate metallic brake shoes 28—29 and 30—31 respectively, each of which shoes is fitted with a brake lining $f$ formed of leather, rubberized fabric or other suitable brake lining material.

The brake members D and E extend parallel to each other in close spaced relation and have their shoe members 29 and 31 connected together at one of their ends by a plate portion 32 which projects tangentially of the shaft 18 and is pivotally secured by a pivot screw 32' to a lug 32'' formed on the inner face of the semi-cylindrical wall of the knee cap member 14. This mounting of the brake members D and E permits of slight lateral oscillatory yielding displacement thereof under side thrusts imposed thereon occasioned by yielding of the resilient sleeves 20 under varying relative loads on side ways strains imposed thereon during use of the leg structure. The plate portion 32 normally overlies a lug 33 on a spider 34 formed on the lower end of the socket member 15. A cushion 35 on the under side of the plate 32 held in place by the screw 32' is provided to abut the lug 33 which arrangement serves as a cushioned stop to limit articulate movement of the knee joint in one direction as will be later described.

The brake shoes 28 and 29 of the brake D are connected together by removable and adjustable screws 36 and 37 arranged on opposite side of the shaft 18 with the brake lining $f$ thereof encircling and frictionally engaging the latter; the frictional engagement of the brake D with the shaft 18 being varied by tightening or loosening the screws 36—37.

The brake shoes 30 and 31 of the brake E are connected together by removable and adjustable screws 38 and 39 and have their brake linings $f$ frictionally engaged with the drum 40 of an over-running clutch F interposed between the brake E and the shaft 18. The over-running clutch F embodies the conventional arrangement of a series of spaced rollers $g$ arranged between inclined faces of teeth $h$ formed on the shaft 18 and extending longitudinally thereof; the rollers g being operable to effect wedge engagement between the inner periphery of the drum 40 and the inclined faces of the teeth h on rotation of the drum in one direction to effect interlocking engagement between the drum 40 and the shaft 18 in said one direction and being operable on rotation of the drum in the opposite direction to shift the rollers out of engagement with the inclined faces of the teeth and thereby permit free rotation of the drum relative to the shaft. In this instance the incline of the teeth is such as to inhibit rotation of the shaft relative to the drum, or in other words, effect interlocking connection between the shaft and drum, when the socket member 15 is moved to swing the shank member C rearward relative to the knee member 14, or on rearward movement of the thigh portion B and the knee member 14 in a rearward direction relative to the socket member 17, or shank portion C as indicated in dotted lines in Fig. 1.

The rollers g are held in place against longitudinal movement between the teeth h by washers i and j encompassing the shaft 18 and loosely bearing against or slightly spaced from the opposite ends of the brake drum 40; the washer i abutting one of the split rings e while the washer j is held in place by a split ring k engaging a circumferential groove in the shaft 18.

By the provision of the over-running clutch F, rearward swinging of the thigh and shank portions B and C relative to each other is restrained by the action of the brake E, since the shaft 18 and the brake drum 40 are then automatically interlocked by the action of the over-running clutch. The extent of this restrained relative movement of the thigh and shank portions B and C is regulated by adjusting the screws 38 and 39 so that the lining f of brake shoes 30 and 31 will more tightly or more loosely frictionally engage the drum 40. The forward swinging movement of the shank portion C or socket member 17 is not effected by the over-running clutch F since the latter will then be free, but will be restrained to some extent according to the adjustment of the brake D; it ordinarily being desirable that this forward swinging movement be less retarded and more free than the opposite swinging movement.

Figs. 8, 9, 10 and 11 illustrate the invention as applied to the knee joint of an artificial leg in which the joint embodies a pair of parallel vertically spaced but contiguous pivotal connections G and H; the pivotal connection G affording a hinge joint between the knee cap member A and the thigh portion B and the pivotal connection H affording a separate hinge connection between the knee cap member A and the shank portion C. The pivotal connections G and H each comprise an assemblage of elements corresponding to the single pivot or articulate joint construction above described and set forth in Figs. 1 to 7 inclusive and accordingly the description of the parts of the hinge connection is applicable to the double pivot construction shown in Figs. 8 to 11 inclusive and therefor needs no repetition here. However, in order to produce the double pivot knee joint structure the knee cap member A is formed with upper and lower hollow semi-spherical end portions 41 and 42 engaged in socket members 43 and 44 rigidly connected to the thigh and shank sections B and C of the artificial leg in a usual manner, and in this instance the limiting of the relative swinging movement in one direction of the thigh and shank sections, or the socket members 43 and 44, to the knee cap members 41 and 42, is effected by forming the socket members 43 and 44 with back walls 45 and 46 respectively in over-lapping relation to back walls 47 and 48 provided on the knee cap members 41 and 42, and fitting the latter back walls with silencing blocks 49—50 arranged to abut the walls 45—46 on forward movement of the thigh and shank members from their retracted positions and thereby limit such forward movement.

Each of the shafts 18 in this double pivot arrangement is equipped with the pair of brakes E and E with over-running clutches F associated with the brakes E in the manner previously described in connection with the single pivot construction, and in this instance the pairs of brakes D—E are independently fastened to the knee cap members 41—42 by extending their connecting plates 32 into overlapped relation to lugs 51 and 52 formed interiorly of the knee cap members 41 and 42, and pivotally connecting the plates 32 to such lugs by pivot screws 53 and 54 in a fashion to permit slight lateral oscillatory movement of the brake assemblages.

In the operation of the invention the brakes D and E are adjusted by their respective regulating screws 36—37 and 38—39 to afford the requisite frictional resistance to articulate movement of the joint A according to the requirement of the individual wearer of the artificial leg; the brakes being adjusted so as to permit relatively free yet frictionally restrained forward turning movement of the knee cap member 14 on the shaft 18, at which time the over-running clutch F runs free, and to offer greater resistance to rearward turning movement of the joint through the medium of the brake E acting on the drum 40, which is then immobolized relative to the shaft 18 by the brake action of the rollers g and the inclined faces h of the over-running clutch. When the weight of the wearer is imposed on the artificial leg the frictional engagement of the brakes D and E is augmented by reason of the upward thrust of the shaft 18 from the shank C and the socket member 17 and the opposed downward thrust imposed on shoes of the brakes D and E through the knee cap member 14 and its connection to the brake shoes 29 and 31 afforded by the pivotal connection of the plate 32 with the knee cap member. The resilient sleeves 20 cooperate in this action in that they permit slight relative longitudinal movement of the knee joint members 14 and 15 and which relative movement is permitted by the provision of adequate clearance between the knee cap member 14 and its encompassing socket member 15.

The cushion sleeves 20 permit slight longitudinal tilting movement of the shaft 18 under sideways strains, which movement is permitted without imposing excessive strains on the supporting connection between the brakes D and E and the knee cap member 14 by reason of such connection comprising a pivot afforded by the screw 25.

As the knee joint swings under rearward movement of the thigh and shank portions B and C, as from the position shown in full lines in Fig. 1 to the position indicated in dotted lines, and as also indicated by the dotted lines in Fig. 3 relative to the full lines, the plate 32 which normally abuts the lug 33 through the cushion 35 when the thigh and shank connections B and C are in their forwardmost position, then moves away from the lug 33 with the knee cap member 14 and which movement under the frictional resistance afforded by the brake E may be continued until the shank portion C swings backwardly against the thigh portion B, and thereafter, on forward movement of the parts under the resistance afforded by the brake D such movement will be limited by the plate 32 abutting the lug 33 through the cushion 35.

The foregoing described operation applies particularly to the invention as applied to a single pivot knee joint, as shown in Figs. 1 to 8 inclusive, but also applies to the invention as applied to the double pivot knee joint shown in Figs. 9 to 11 inclusive as far as the braking action on the pivot shafts 18 is concerned, which constitutes the essence of the invention, but in the double pivot arrangement as here shown the rearward swinging movement of the joint is limited at each end of the joint in the manner previously described.

It is to be noted that in the operation of the joint A, the brake D regulates the forward swing of the shank portion C so that it will not move too fast, while the brake E when properly adjusted controls the buckling action of the joint and stabilizes the bending of the joint under the loads imposed thereon.

While we have shown and described a specific embodiment of our invention, we do not limit ourselves to the exact details of construction set forth, and the invention embraces such changes, modifications and equivalents of the parts and their formation and arrangement as come within the purview of the appended claims.

We claim:

1. In a knee joint for artificial limbs, a knee cap member having a hollow semi-cylindrical portion, a socket member encompassing a part of said semi-cylindrical portion, a shaft supported at its ends by said socket member, roller bearings on said shaft attached to said knee cap member and affording an articulate joint between said knee cap and socket members, an over-running clutch on said shaft, within said knee cap member, a drum embodied in said clutch, a friction brake encompassing said drum, a friction brake encompassing said shaft, and connections between said brakes and said knee cap member.

2. The structure called for in claim 1 together with adjustable means for independently regulating said brakes.

3. In a knee joint for artificial limbs, a knee cap member having a hollow semi-cylindrical portion, a socket member encompassing a part of said semi-cylindrical portion in spaced relation thereto, a shaft rigidly supported at its ends by said socket member and extending axially of the semi-cylindrical portion of said knee cap member, roller bearings on said knee cap adjacent each end thereof, a resilient sleeve encompassing each of said bearings attached to said knee cap member wherein said shaft and said knee cap member may oscillate relative to each other longitudinally of said shaft, an over-running clutch on said shaft within said knee cap member, a drum embodied in said clutch, a friction brake encompassing said drum, a friction brake encompassing said shaft, and a pivotal connection between said brakes and said knee cap member.

4. In a knee joint for artificial limbs, a socket member having opposed upwardly extending lugs, a shaft extending between said lug, means detachably connecting said lugs and shaft holding the latter against movement relative to said socket member, resilient sleeves encompassing said shaft adjacent said lugs, roller bearings interposed between said sleeves and said shaft, a hollow knee cap member having opposed cylindrical portions encompassing and engaging said resilient sleeves, a pair of friction brakes attached to said knee cap member encompassing said shaft, one of said brakes having direct frictional engagement with said shaft, an over-running clutch interposed between the other of said brakes and said shaft, and a drum embodied in said clutch frictionally engaged by said last named brake, said clutch interlocking said shaft and drum on rearward articulation of the joint and freeing such shaft and drum relative to each other on forward articulation of the joint.

5. In a knee joint for artificial limbs, a socket member, a shaft rigidly supported at its ends on said socket member, a knee cap member pivotally supported on said shaft, means for limiting relative pivotal movement of said socket member and knee cap member in one direction, a brake frictionally engaging said shaft and connected to said knee cap member, a brake drum loosely encompassing said shaft, means for interlocking said brake drum and shaft for collective rotation in one direction only, and a second friction brake encompassing and engaging said drum connected to said knee cap member.

6. The structure called for in claim 5 together with means for independently adjusting said brakes to regulate their respective frictional engagement with said shaft to said drum whereby said brakes may be set to offer greater resistance to articulation of the joint in one direction than in the other.

7. In a knee joint for artificial limbs, a knee cap member, a pair of opposed roller bearings carried by said knee cap member, a shaft supported in said bearings having flat outer ends terminating contiguous outer faces of said knee cap member and formed with axially extending internally threaded recesses, a socket member having parallel opposed lugs positionable astride said knee cap member in abutting relation thereto and to the ends of said shaft, means for rigidly securing the ends of said shaft to said lug, a pair of friction brakes carried by said knee cap member interiorly thereof encompassing said shaft intermediate said bearings, a friction shoe on one of said brakes directly engaging said shaft, an over-running clutch on said shaft, a drum embodied in said clutch, and a friction shoe on the other of said brakes frictionally engaging said drum.

8. The structure called for in claim 7 together with means for independently regulating said brakes relative to each other.

FRED C. LUCAS.
ROY P. LUCAS.

REFERENCES CITED

The following references are of record in the file of this patent:

UNITED STATES PATENTS

| Number | Name | Date |
|---|---|---|
| 2,279,962 | Woodall | Apr. 14, 1942 |
| 2,513,134 | Borghausen | June 27, 1950 |
| 2,542,567 | Peters | Feb. 20, 1951 |

FOREIGN PATENTS

| Number | Country | Date |
|---|---|---|
| 495,281 | Great Britain | Nov. 10, 1938 |